United States Patent
Chen et al.

(10) Patent No.: US 9,791,728 B2
(45) Date of Patent: Oct. 17, 2017

(54) FIXTURE FOR PREVENTING DEFORMATION OF GLASS PANEL OF DISPLAY MODULE

(71) Applicant: SHENZHEN CHINA STAR OPTOELECTRONICS TECHNOLOGY CO., LTD., Shenzhen, Guangdong (CN)

(72) Inventors: Cheng Hung Chen, Guangdong (CN); Jingfeng Xue, Guangdong (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 120 days.

(21) Appl. No.: 14/111,792

(22) PCT Filed: Jun. 30, 2013

(86) PCT No.: PCT/CN2013/078540
§ 371 (c)(1),
(2) Date: Oct. 15, 2013

(87) PCT Pub. No.: WO2014/205855
PCT Pub. Date: Dec. 31, 2014

(65) Prior Publication Data
US 2017/0184906 A1  Jun. 29, 2017

(30) Foreign Application Priority Data
Jun. 26, 2013 (CN) .......................... 2013 1 0260975

(51) Int. Cl.
*G02F 1/13* (2006.01)
*G02F 1/1333* (2006.01)
*F21V 8/00* (2006.01)

(52) U.S. Cl.
CPC ..... *G02F 1/133308* (2013.01); *G02B 6/0088* (2013.01); *G02F 1/1303* (2013.01);
(Continued)

(58) Field of Classification Search
CPC .......................................................... G02F 1/13
See application file for complete search history.

(56) References Cited

U.S. PATENT DOCUMENTS 7,609,335 B2 * 10/2009 Ryu .................. G02F 1/133604
349/58
2003/0160935 A1 * 8/2003 Lee ....................... G02F 1/1341
349/187
(Continued)

FOREIGN PATENT DOCUMENTS

CN        1949055 A       4/2007
CN      201170823 Y      12/2008
(Continued)

OTHER PUBLICATIONS

Juanjuan Zheng, the International Searching Authority written comments, dated Apr. 2014, CN.

*Primary Examiner* — Timothy L Rude

(57) ABSTRACT

A fixture for preventing deformation of a glass panel of a display module, for receiving and fixing a light guide plate and a glass panel. It comprises an array cell and a color filter cell. The array cell is provided with a metal routing layer. The color filter cell is provided with a color resist layer. The fixture consists and a lower fixing end, with upper ends, the array cell and the color filter cell received in the upper fixing end, while lower ends thereof received in the lower fixing end, so the color resist layer in the color filter cell and the metal routing layer in the array cell are aligned in parallel. By a gap between the glass panel and the inner side face and
(Continued)

bottom surface, the glass panel fine tunes properly for quick recovery by virtue of its gravity when deformation occurs.

12 Claims, 2 Drawing Sheets

(52) U.S. Cl.
CPC .............. *G02F 2001/13332* (2013.01); *G02F 2001/133322* (2013.01); *G02F 2001/133331* (2013.01); *G02F 2201/54* (2013.01)

(56) References Cited

U.S. PATENT DOCUMENTS

| | | | |
|---|---|---|---|
| 2004/0001177 A1* | 1/2004 | Byun | .................... G02F 1/1339 349/187 |
| 2007/0013861 A1* | 1/2007 | Lee | ....................... G02F 1/1333 349/187 |
| 2009/0079901 A1 | 3/2009 | Yada et al. | |
| 2011/0120770 A1 | 5/2011 | Yokonuma | |

FOREIGN PATENT DOCUMENTS

| | | |
|---|---|---|
| CN | 101373570 A | 2/2009 |
| CN | 101620339 A | 1/2010 |
| CN | 101713889 A | 5/2010 |
| CN | 102957953 A | 3/2013 |
| CN | 103226255 A | 7/2013 |
| JP | 2006235092 A | 9/2006 |

\* cited by examiner

FIXTURE FOR PREVENTING DEFORMATION OF GLASS PANEL OF DISPLAY MODULE

FIELD OF THE INVENTION

The invention relates to a liquid crystal device, in particular to a fixture for preventing deformation of a glass panel of a display module.

BACKGROUND OF THE INVENTION

A conventional liquid crystal module is generally fixed with a glass panel on four edges, i.e., upper side, lower side, left side and right side. When it is applied in a large-size panel, such as above 32 inches, referring to FIG. 2, the glass panel is likely to suffer bending deformation and have no a space for stretchable adjustment because the upper, lower, left and right ends of the glass panel are fixed, as a result, the alignment between an array cell 20' and a color filter cell 22' offsets, and the alignment between a color resist 221' of the color filter cell 22' and a side metal routing 201' of the array cell 20' offsets, thereby resulting in pixel light leakage, the macroscopic characteristics of show up serious crosstalk and reduced contrast.

Therefore, it is necessary to provide a fixture for preventing deformation of a glass panel of a display module, which is appropriate for a large-size panel.

SUMMARY OF THE INVENTION

To achieve the above purpose, the invention provides a fixture for preventing deformation of a glass panel of a display module, for receiving and fixing a light guide plate and a glass panel. The glass panel comprises an array cell and a color filter cell. The array cell is provided with a metal routing layer. The color filter cell is provided with a color resist layer. The fixture consists of an upper fixing end and a lower fixing end, with upper ends of the light guide plate, the array cell and the color filter cell received in the upper fixing end, while lower ends thereof received in the lower fixing end, so that the color resist layer in the color filter cell and the metal routing layer in the array cell are aligned in parallel.

Preferably, the lower fixing end comprises a first lower fixing end and a second lower fixing end, with the first lower fixing end placed above the second lower fixing end. The lower end of the light guide plate is received in the first lower fixing end. The lower end of the glass panel is received in a space zone between the first lower fixing end and the second lower fixing end. The second lower fixing end is surrounded by at least two side arms and a bottom arm. Inner side faces of the side arms of the second lower fixing end are opposite to a side face of the glass panel, and an inner bottom surface of the bottom arm is opposite to a bottom surface of the glass panel.

Preferably, a gap is provided between the bottom surface of the glass panel and the inner bottom surface of the bottom arm of the second lower fixing end, and a gap is also provided between the side face of the glass panel and the inner side faces of the side arms of the second lower fixing end. The automatic fine tuning of the glass panel is realized by the gap between the glass panel and the second lower fixing end. The width of the gap is 0.1 mm-10.0 mm.

Preferably, the glass panel is fixed on a single side. At the upper fixing end, the light guide plate and the array cell of the glass panel are fitted with each other by an adhesive layer, the length of which is equal to or less than the width of the glass panel. By fixing on a single side, another free end of the glass panel may stretch freely within the gap to avoid the bending deformation of the glass panel, so that the glass panel may recover quickly by its own gravity.

In the invention, the upper fixing end is provided with a first receiving groove, the first lower fixing end is provided with a second receiving groove, and the second lower fixing end is provided with a third receiving groove. The depth of the first receiving groove is 2.0 mm-20 mm, the depth of the second receiving groove is 2.0 mm-15 mm, and the depth of the third receiving groove is 2.0 mm-25 mm.

Compared with the prior art, the fixture for preventing deformation of a glass panel of a display module in the invention changes the original fixing manner on four points to be the current fixing manner at two ends, by which the light guide plate and the glass panel are nested at the upper and lower ends thereof only, thereby solving the problem of extrusion deformation caused by the fixing manner on multiple points. In a manner of nesting at two ends and fixing on one side, the glass panel is suspended between the upper fixing end and the second lower fixing end. In addition, by a gap between the glass panel and the inner side face and bottom surface of the second lower fixing end, the glass panel may fine tune properly for quick recovery by virtue of its own gravity when deformation occurs, thereby avoiding abnormal events, such as pixel light leakage, caused by alignment deviation between the color resist of the color filter cell and the side metal routing of the array cell in the glass panel resulted from the deformation of the glass panel. Therefore, the assembling and fixing of a large-size liquid crystal panel is solved.

BRIEF DESCRIPTIONS OF THE DRAWINGS

DETAILED DESCRIPTIONS OF THE PREFERRED EMBODIMENTS

Figure 1:
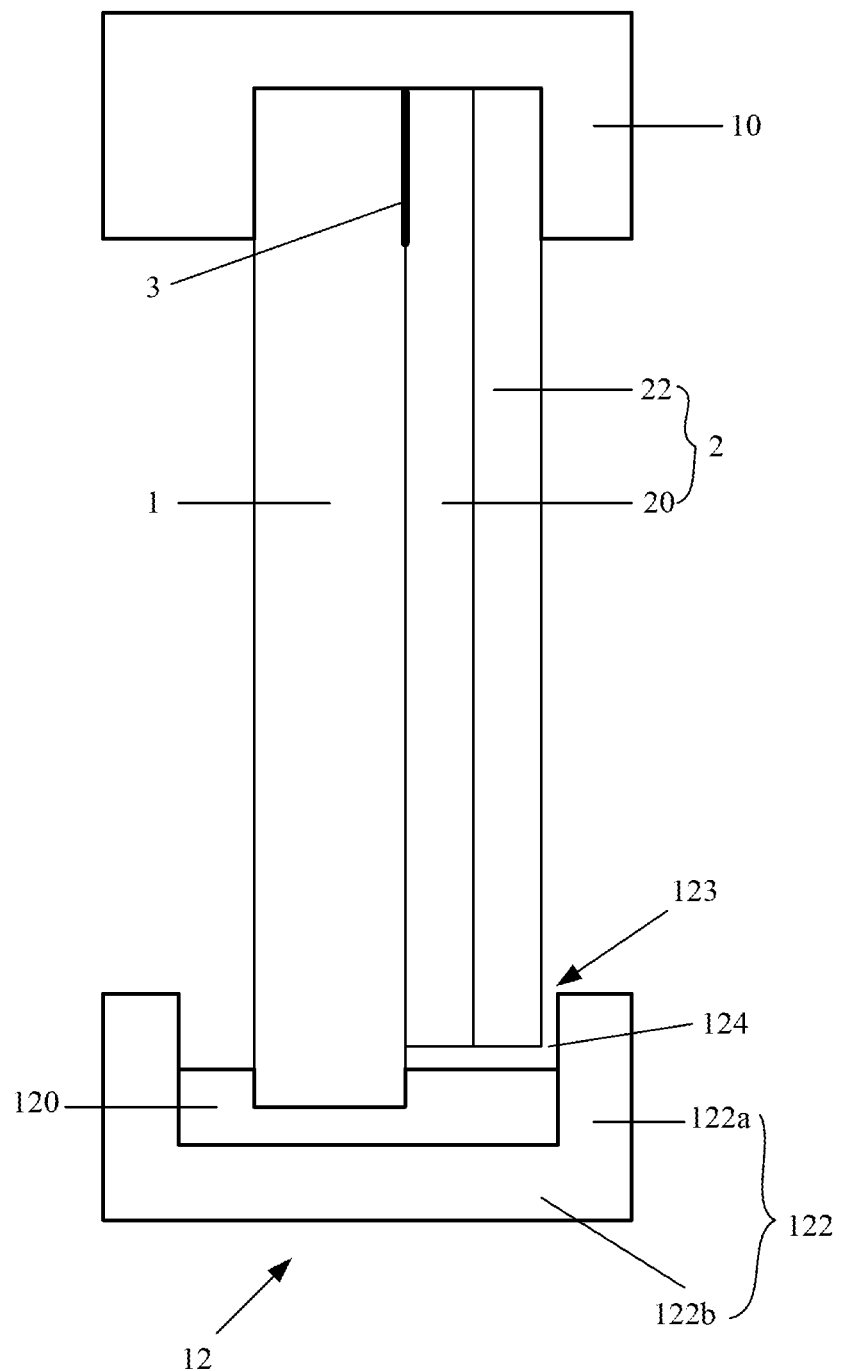
FIG. 1 is an assembly diagram of a fixture for preventing deformation of a glass panel of a display module in the invention.
Figure 2:
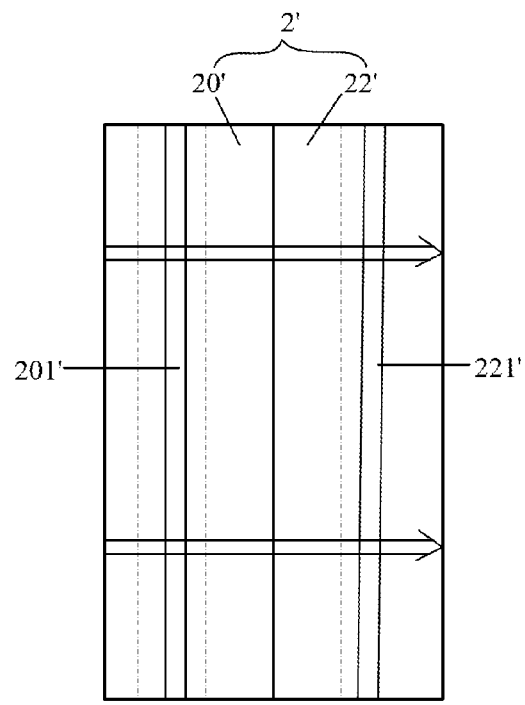
FIG. 2 is an alignment diagram of an array cell and a color filter cell of the existing glass panel.

As shown in FIG. 1, to ensure the alignment of a light guide plate and a glass panel of a liquid crystal display module and prevent the deformation of the glass panel, the invention provides a fixture for preventing deformation of a glass panel of a display module, for receiving and fixing a light guide plate 1 and a glass panel 2. The fixture consists of an upper fixing end 10 and a lower fixing end 12 and fixes two ends of the light guide plate 1 and the glass panel 2 by the upper fixing end 10 and the lower fixing end 12, wherein upper ends of the light guide plate 1 and the glass panel 2 are received in the upper fixing end 10, while lower ends thereof are received in the lower fixing end 12.

The glass panel 2 comprises an array cell 20 and a Color Filter cell (CF cell) 22 fitted with other. The array cell 20 is provided with a metal routing layer 201. The CF cell 22 is provided with a color resist layer 221. The array cell 20 is opposite to the light guide plate 1. The array cell 20 and the CF cell are aligned and fitted with each other. Rays emitted by the light guide plate 1 are shot out from the array cell 20 and the CF cell 22 in turn, and then pixels are displayed by the alignment of the metal routing later 201 of the array cell 20 and the color resist layer 221 of the CF cell 22.

In a preferred embodiment of the invention, the lower fixing end 12 comprises a first lower fixing end 120 and a second lower fixing end 122, with the first lower fixing end 120 placed above the second lower fixing end 122. The lower end of the light guide plate 1 is received in the first lower fixing end 120, while the lower end of the glass panel 2 is received in a space zone 123 between the first lower fixing end 120 and the second lower fixing end 122. The upper fixing end 10 is opposite to the lower fixing end 12, the light guide plate 1 is parallel to the glass panel 2, and the glass panel 2 is suspended in a fixing manner on one side. To avoid the bending deformation caused by the fraction between the light guide plate 1 and the glass panel 2, the lower ends of the light guide plate 1 and the glass panel 2 are placed into two different fixing ends, respectively. The light guide plate 1 is embedded between the upper fixing end 10 and the first lower fixing end 120. The glass panel 2 is fitted with the light guide plate 1 and embedded between the upper fixing end 10 and the space zone 123 that is located between the first lower fixing end 120 and the second lower fixing end 122, thereby reducing the friction between the glass panel 2 and the light guide plate 1.

The array cell 20 is fitted with the CF cell 22, the lower end of the array cell being received in the space zone 123 between the first lower fixing end 120 and the second lower fixing end 122, the upper end thereof being received in the upper fixing end 10 and fitted with the light guide plate 1.

The upper fixing end 10 is provided with a first receiving groove, the first lower fixing end 120 is provided with a second receiving grove, and the second lower fixing end 122 is provided with a third receiving groove approximately equivalent to the first receiving groove. The second lower fixing end 122 is surrounded by at least two side arms 122*a* and a bottom arm 122*b*. Inner side faces of the side arms 122*a* of the second lower fixing end 122 are opposite to a side face of the glass panel 2. A bottom surface of the bottom arm 122*b* is opposite to a bottom surface of the glass panel 2. A gap 124 is provided between the bottom surface of the glass panel 2 and the bottom surface of the bottom arm 122*b* of the second lower fixing end 122, and a gap 124 is also provided between the side face of the glass panel 2 and the inner side faces of the side arms 122*a* of the second lower fixing end 122. By the gap 124 between the lower end of the glass panel 2 and the inner side face and inner bottom surface of the second lower fixing end 122, the glass panel 2 may fine tune properly to recover to a vertical state quickly by its own gravity when bending occurs, wherein the width of the gap is 0.1 mm-10.0 mm. The depth of the first receiving groove is 2.0 mm-20 mm, the depth of the second receiving groove is 2.0 mm-15 mm, and the depth of the third receiving groove is 2.0 mm-25 mm.

To prevent the deformation of the glass panel 2, the glass panel 2 is fixed on a single side. At the upper fixing end 10, the light guide plate 1 and the glass panel 2 are fitted with each other by an adhesive layer 3. It may be understood that, at the upper fixing end, the light guide plate 1 and the glass panel 2 may be bound together by other frame-free fixing manners to realize fixing on a single side. Events such as oblique light path alignment and abnormal pixel display caused by the bending of the glass panel are avoided via the suspension of the glass panel 2. Meanwhile, the fine tuning of the glass panel 2 is realized via the gap between the glass panel 2 and the inner side of the second lower fixing end 122, so that the glass panel recovers automatically and quickly after bent, thereby greatly reducing the probability of deformation. The length of the adhesive layer 3 is equal to or less than the width of the glass panel.

Figure 3:
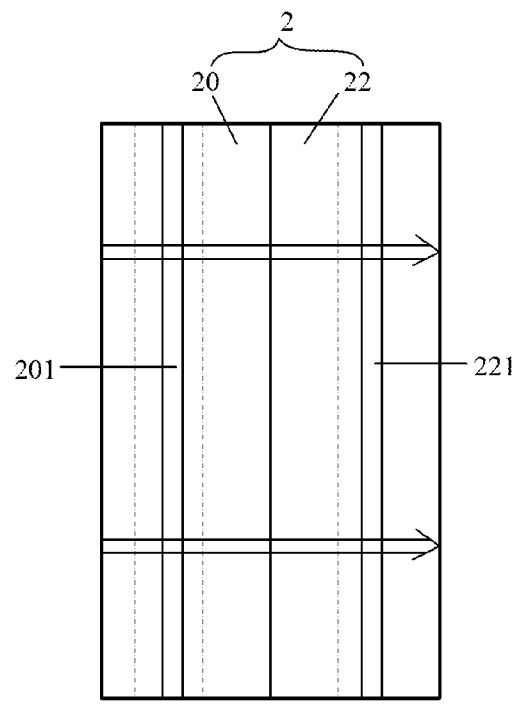
FIG. 3 is an alignment diagram of an array cell and a color filter cell of a fixture for preventing deformation of a glass panel of a display module in the invention.

FIG. 3 is an alignment diagram of an array cell and a color filter cell of a fixture for preventing a glass panel of a display module from deformation in the invention. In FIG. 3, upper ends of the array cell 20 and the CF cell 22 in the glass panel are received in the upper fixing end 10. Because the array cell and the CF cell are suspended on one side, other ends thereof naturally drop into the lower fixing end 12. As two glass panels are in a naturally vertical state, the two glass panels will not suffer bending deformation. The normal alignment of the color resist 221 of the CF cell 22 and the side metal route 201 of the array cell 20 makes the color resist 221 of the CF cell 22 and the side metal route 201 of the array cell 20 aligned in parallel, in this way, the pixel display of the CF cell 22 is normal.

The fixture for preventing deformation of a glass panel of a display module in the invention changes the original fixing manner on four points to be the current fixing manner at two ends, by which the light guide plate and the glass panel are nested at the upper and lower ends thereof only, thereby solving the problem of extrusion deformation caused by the fixing manner on multiple points. In a manner of nesting at two ends and fixing on one side, the glass panel is suspended between the upper fixing end and the second lower fixing end. In addition, by a gap between the glass panel and the inner side face and bottom surface of the second lower fixing end, the glass panel may fine tune properly for quick recovery by virtue of its own gravity when deformation occurs, thereby avoiding abnormal events, such as pixel light leakage, caused by alignment deviation between the color resist of the color filter cell and the side metal routing of the array cell in the glass panel resulted from the deformation of the glass panel. Therefore, the assembling and fixing of a large-size liquid crystal panel is solved.

What is claimed is:

1. A fixture for preventing deformation of a glass panel of a display module, for receiving and fixing a light guide plate and a glass panel, the glass panel comprising an array cell and a color filter cell fitted with each other, the array cell being provided with a metal routing layer, and the color filter cell being provided with a color resist layer, wherein the fixture consists of an upper fixing end and a lower fixing end, with upper ends of the light guide plate, the array cell and the color filter cell received in the upper fixing end, while lower ends thereof received in the lower fixing end, so that the color resist layer in the color filter cell and the metal routing layer in the array cell are aligned in parallel; the lower fixing end comprises a first lower fixing end and a second lower fixing end, with the first lower fixing end placed above the second lower fixing ends; the lower end of the light guide plate is received in the first lower fixing end, and the lower end of the glass panel is received in a space zone between the first lower fixing end and the second lower fixing end.

2. The fixture for preventing deformation of a glass panel of a display module according to claim 1, wherein the second lower fixing end is surrounded by at least two side arms and a bottom arm, inner side faces of the side arms of the second lower fixing end being opposite to a side face of the glass panel, and the inner bottom surface of the bottom arm being opposite to the bottom surface of the glass panel.

3. The fixture for preventing deformation of a glass panel of a display module according to claim 2, wherein a gap is provided between the bottom surface of the glass panel and the inner bottom surface of the bottom arm of a second lower fixing groove.

4. The fixture for preventing deformation of a glass panel of a display module according to claim 3, wherein a gap is provided between the side surface of the glass panel and the inner side faces of the side arms of the second lower fixing groove.

5. The fixture for preventing deformation of a glass panel of a display module according to claim 4, wherein the width of the gap is 0.1 mm-10.0 mm.

6. The fixture for preventing deformation of a glass panel of a display module according to claim 3, wherein the width of the gap is 0.1 mm-10.0 mm.

7. The fixture for preventing deformation of a glass panel of a display module according to claim 2, wherein, at the upper fixing end, the light guide plate and the array cell of the glass panel are fitted with each other by an adhesive layer.

8. The fixture for preventing deformation of a glass panel of a display module according to claim 7, wherein the length of the adhesive layer is equal to or less than the width of the glass panel.

9. The fixture for preventing deformation of a glass panel of a display module according to claim 1, wherein the upper fixing end is provided with a first receiving groove, the first lower fixing end is provided with a second receiving groove, and the second lower fixing end is provided with a third receiving groove.

10. The fixture for preventing deformation of a glass panel of a display module according to claim 9, wherein the depth of the first receiving groove is 2.0 mm-20 mm.

11. The fixture for preventing deformation of a glass panel of a display module according to claim 9, wherein the depth of the second receiving groove is 2.0 mm-15 mm.

12. The fixture for preventing deformation of a glass panel of a display module according to claim 9, wherein the depth of the third receiving groove is 2.0 mm-25 mm.

* * * * *